(12) United States Patent
Keil

(10) Patent No.: US 10,836,125 B2
(45) Date of Patent: Nov. 17, 2020

(54) PULTRUSION OF CONTINUOUS SECTIONS HAVING DISCONTINUOUS CROSS-SECTIONAL PROFILE

(71) Applicant: Bayerische Motoren Werke Aktiengesellschaft, Munich (DE)

(72) Inventor: Cornelius Johan Kalle Keil, Goslar (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 196 days.

(21) Appl. No.: 15/783,144

(22) Filed: Oct. 13, 2017

(65) Prior Publication Data

US 2018/0036971 A1 Feb. 8, 2018

Related U.S. Application Data

(63) Continuation of application No. PCT/EP2016/053100, filed on Feb. 15, 2016.

(30) Foreign Application Priority Data

Apr. 16, 2015 (DE) .................. 10 2015 206 917

(51) Int. Cl.
*B29C 70/52* (2006.01)
*B29C 70/46* (2006.01)
(Continued)

(52) U.S. Cl.
CPC ............ *B29C 70/526* (2013.01); *B29C 70/46* (2013.01); *B29C 70/52* (2013.01); *B29C 70/527* (2013.01);
(Continued)

(58) Field of Classification Search
CPC ........ B29C 70/52; B29C 70/46; B29C 70/545
See application file for complete search history.

(56) References Cited

U.S. PATENT DOCUMENTS 2,779,388 A 1/1957 Quoss
2,938,566 A 5/1960 Toulmin, Jr.
(Continued)

FOREIGN PATENT DOCUMENTS

CN 101663157 A 3/2010
CN 102917849 A 2/2013
(Continued)

OTHER PUBLICATIONS

International Search Report (PCT/ISA/210) issued in PCT Application No. PCT/EP2016/053100 dated May 4, 2016 with English translation (five pages).

(Continued)

*Primary Examiner* — Benjamin A Schiffman
(74) *Attorney, Agent, or Firm* — Crowell & Moring LLP

(57) ABSTRACT

A pultrusion device and method are provided for producing a fiber-reinforced continuous section which has a second cross-sectional profile that is discontinuous in a direction of pultrusion with a press forming device for shaping the continuous section. The press forming device includes a first shaping device for producing the continuous section with a continuous cross-sectional profile and a second shaping device, which follows on from the first shaping device in the direction of pultrusion, for shaping the second discontinuous cross-sectional profile of the continuous section. A punching tool is arranged between the first shaping device and the second shaping device and is designed to bring about a local change in shape of the continuous cross-sectional profile, at least in a defined portion of the continuous section, in order to produce a first discontinuous cross-sectional profile of the continuous section.

7 Claims, 3 Drawing Sheets

(51) Int. Cl.
*B29C 70/54* (2006.01)
*B29D 99/00* (2010.01)
*B29C 59/02* (2006.01)
*B29C 70/16* (2006.01)
*B29L 31/00* (2006.01)

(52) U.S. Cl.
CPC .......... *B29C 70/528* (2013.01); *B29C 70/545* (2013.01); *B29D 99/0007* (2013.01); *B29C 59/021* (2013.01); *B29C 70/16* (2013.01); *B29C 70/521* (2013.01); *B29C 70/523* (2013.01); *B29L 2031/003* (2013.01)

(56) References Cited

U.S. PATENT DOCUMENTS

| | | | |
|---|---|---|---|
| 3,530,212 A | 9/1970 | Kienle et al. | |
| 3,657,040 A * | 4/1972 | Shobert | B29C 70/525 |
| | | | 156/178 |
| 4,445,957 A * | 5/1984 | Harvey | B29C 43/08 |
| | | | 156/180 |
| 5,026,447 A | 6/1991 | O'Connor | |
| 5,182,060 A * | 1/1993 | Berecz | B29C 53/043 |
| | | | 264/70 |
| 5,556,496 A | 9/1996 | Sumerak | |
| 5,716,487 A | 2/1998 | Sumerak | |
| 7,748,099 B2 * | 7/2010 | Roush | B29C 66/721 |
| | | | 29/422 |
| 8,226,866 B2 * | 7/2012 | Arelt | F03D 1/065 |
| | | | 264/136 |
| 2007/0204948 A1 | 9/2007 | Gauchel et al. | |
| 2010/0064946 A1 * | 3/2010 | Watson | B29C 48/914 |
| | | | 108/57.25 |
| 2011/0049750 A1 | 3/2011 | Bechtold | |
| 2013/0101694 A1 | 4/2013 | Theinert et al. | |
| 2014/0251529 A1 | 9/2014 | Blot et al. | |
| 2015/0224683 A1 * | 8/2015 | Hansen | B29C 35/0805 |
| | | | 264/403 |
| 2015/0376946 A1 * | 12/2015 | Kurzer | B29C 65/70 |
| | | | 182/194 |
| 2018/0066396 A1 * | 3/2018 | Ratcliffe | B32B 23/10 |
| 2018/0257318 A1 * | 9/2018 | Orange | B29C 70/523 |

FOREIGN PATENT DOCUMENTS

| | | | |
|---|---|---|---|
| CN | 103206168 A | 7/2013 | |
| CN | 103958165 A | 7/2014 | |
| DE | 690 07 648 T2 | 7/1994 | |
| DE | 696 05 645 T2 | 6/2000 | |
| DE | 100 14 376 A1 | 7/2001 | |
| GB | 2101033 A * | 1/1983 | ........... B29C 70/525 |

OTHER PUBLICATIONS

German-language Written Opinion (PCT/ISA/237) issued in PCT Application No. PCT/EP2016/053100 dated May 4, 2016 (five pages).
German Search Report issued in counterpart German Application No. 10 2015 206 917.6 dated Sep. 18, 2015 with partial English translation (12 pages).
Chinese-language Office Action issued in counterpart Chinese Application No. 201680004307.6 dated Sep. 27, 2018 with English translation (15 pages).

* cited by examiner

PULTRUSION OF CONTINUOUS SECTIONS HAVING DISCONTINUOUS CROSS-SECTIONAL PROFILE

CROSS REFERENCE TO RELATED APPLICATIONS

This application is a continuation of PCT International Application No. PCT/EP2016/053100, filed Feb. 15, 2016, which claims priority under 35 U.S.C. § 119 from German Patent Application No. 10 2015 206 917.6, filed Apr. 16, 2015, the entire disclosures of which are herein expressly incorporated by reference.

BACKGROUND AND SUMMARY OF THE INVENTION

The invention relates to a pultrusion device for producing a fiber-reinforced continuous section with a cross-sectional profile that is discontinuous in the direction of pultrusion, as well as to a process for its production.

Pultrusion processes (also called continuous drawing processes) permit the production of continuous sections, particularly fiber-reinforced continuous sections made of plastic material, having a usually predefined profile cross-section. In this case, in a first step, reinforcing fibers consisting, for example, of glass fibers or carbon fibers, held on coils, are withdrawn from the coils and are impregnated in an impregnating tool with a matrix, for example, a resin. Subsequently, the impregnated fibers are pulled through a pressing forming device and are shaped into a pultrusion section (in the following also called "continuous section") with a preset cross-section, before the pultrusion section is hardened by a rising temperature effect. A section produced in this manner is continuously pulled through the individual processing stations by way of a pulling device and is subsequently fed to a cutting tool for cutting-off portions of a defined length.

The continuous sections produced by means of the known pultrusion processes normally have a cross-sectional profile that is continuous along its length. This means that the cross-sectional profile is constructed to be continuous without any abrupt changes of profile, so that an outer contour of the continuous section is also defined by a continuous course, thus without abrupt changes of the cross-section, particularly without any "steps". In order to achieve cross-section changes of the continuous section, changes of the pressing forming geometry are implemented during the operation at a concurrent conveying speed of the continuous section, whereby, however, only exclusively continuous cross-section changes of the continuous section can be produced, which extend continuously along a defined length of the continuous section.

In contrast, discontinuous, thus unsteady cross-section changes, which occur "abruptly" in a defined portion of the continuous section, so far have been possible only while accepting considerable disadvantages. Thus, it is known, for example, to provide a punching tool for the working of the hardened continuous section only after the conclusion of the press forming and hardening.

However, in this case, there is the risk that, when working the continuous section in the hardened state, particularly the integrated fiber structure and the matrix enclosing the fibers will be damaged because the already hardened plastic material has a lower strain to rupture and a lower plastic formability. In addition, high friction forces as well as high tensile strain of the preceding press forming device affect the continuous section to be processed, so that a risk of tearing is clearly augmented.

Alternatively used machining steps for the continuous sections also require a hardened condition of the matrix and result in particularly high expenditures and costs. They also risk damaging or cutting integrated reinforcing fibers, whereby a considerable local weakening of the material of the continuous section occurs. This, as a rule, may result in making the damaged continuous section useless.

In contrast, in order to machine a profile cross-section before the hardening, a pultrusion device is known, for example, from German patent document DE 69605645 T2 for producing continuous sections with a cross-sectional profile, which is variable in a pultrusion direction. This pultrusion device provides a stationary or movable forming nozzle that can cause a local change of cross-section. However, in this case, the continuous section to be shaped is exposed to considerable tensile strain of the pulling device that follows, which could result in an easy tearing of the continuous section.

German patent document DE69007648 T2 illustrates an example of the pultrusion device, where a continuous change of cross-section is achieved by various nozzle geometries.

It is therefore an object of the invention to achieve a production of a fiber-reinforced continuous section with a cross-sectional profile that is discontinuous in a pultrusion direction and to simultaneously reduce or even prevent damage to the produced continuous section or the integrated reinforcing fibers.

This and other objects are achieved by a pultrusion device, as well as by a corresponding process, according to embodiments of the invention.

Accordingly, a pultrusion device is provided for producing a fiber-reinforced continuous section, wherein the continuous section has a second cross-sectional profile that is discontinuous in a pultrusion direction. For this purpose, the pultrusion device has a press forming device for shaping the continuous section, comprising:

a first shaping device for producing the continuous section having a continuous cross-sectional profile, and a second shaping device, which follows the first shaping device in the pultrusion direction, for shaping the second discontinuous cross-sectional profile of the continuous section.

In addition, the press forming device comprises a punching tool, which is arranged between the first shaping device and the second shaping device and is designed for causing a local change in shape of the continuous cross-sectional profile at least in a defined portion of the continuous section, in order to produce a first discontinuous cross-sectional profile of the continuous section. The first discontinuous cross-sectional profile is the entire cross-sectional profile of the continuous section which has passed through the punching tool, irrespective of an actual processing in the punching tool. The first discontinuous cross-sectional profile therefore comprises the portions processed by the punching tool as well as the portions that are not processed and are shaped only by the first shaping device.

Basically, all known and suitable reinforcing fibers, particularly glass, carbon, aramid, metal or natural fibers, as well as arbitrary mixtures of these fiber types, can be used as reinforcing fibers for the fiber reinforcement of the continuous section.

Because of the division of the press forming device in two shaping devices, the pultrusion device makes it possible to arrange the punching tool between these two devices and thereby produce, in a particularly easy and reliable manner, a continuous section with the final second discontinuous cross-sectional profile.

A special advantage of this pultrusion device is the fact that, as a result of the two-stage construction of the press forming device between the two shaping devices, only a reduced tensile strain proportion acts upon the continuous section. The entire tensile strain of the pultrusion device will be applied to the continuous section only after the second shaping device. This means that, as a result of this further development, the processing by the punching tool can take place at a reduced tensile strain load of the continuous section, and the risk of tearing is thereby clearly reduced. The exact amount of the reduced tensile strain depends, among other things, on the further development and coordination of the first and second shaping device as well as the exact position of the punching tool between the two shaping devices, and can be varied correspondingly.

The first and second shaping device may be designed to be mutually completely separate or spaced with respect to one another, in order to arrange the punching tool between the two shaping devices. As an alternative, instead of such a complete separation of the two devices, a one-piece shape is also contemplated, so that, although the two devices are connected with one another, an arrangement of the punching tool provided between them can be made available at a corresponding point by way of a corresponding recess for the punching tool.

The continuous section with the discontinuous cross-sectional profile is particularly a continuous section whose arbitrary profile cross-sections which, in each case, are viewed in a plane perpendicular to the pultrusion direction, can change along the longitudinal direction of the continuous section not only continuously, and therefore steadily, but, if necessary, also discontinuously, thus abruptly or tangentially. Correspondingly, by means of the cross-sectional profile, a discontinuous course of an outer contour of the continuous section is defined.

For example, the continuous section is first pre-shaped in the first shaping device and first obtains at each point of its length the first (preliminary) profile cross-section defined by the first shaping device. This first profile cross-section may either be kept constant or be implemented to be variable in the longitudinal direction of the continuous section. In the case of a constant cross-section, a continuous section is therefore produced which, along its longitudinal dimension, always has the same shape and size of the profile cross-section and thereby defines a first alternative of a continuous cross-sectional profile.

Alternatively, a geometry of the first shaping device can be changed with a simultaneous advance for conveying the continuous section in the pultrusion direction. In this case, a geometry of the first profile cross-section of the continuous section changes along its longitudinal dimension. In this case, as a result of the simultaneous advance, nevertheless a steady continuous cross-section profile is produced without any abrupt changes.

In both cases, a continuous section is therefore produced first which has a steady continuous cross-sectional profile without any abrupt changes. Subsequently, by way of the punching tool, the local shape of the profile cross-section can be processed in one or more selected portions of the continuous section, such that at least in this or these portion(s) the previously continuous cross-sectional profile is reshaped into the (first) discontinuous cross-sectional profile. By means of the described processing and reshaping of the above-mentioned cross-sections and cross-sectional profiles, in particular the change of the outer contour of the continuous section is caused. Naturally, also as an alternative or in addition, a corresponding change can be caused of an inner contour.

Subsequently, the continuous profile is fed to the second shaping device, which produces the second discontinuous cross-sectional profile of the continuous section. In this case, the first discontinuous cross-sectional profile pre-shaped by the punching tool is transformed to the second discontinuous cross-sectional profile when passing through the second shaping device. This means that another change of shape of the continuous section takes place in the second shaping device. This change of shape either takes place in the portions processed by the punching tool or in the portions of the continuous section not processed by the punching tool and only shaped by the first shaping device. Likewise, the second shaping device may also be constructed for processing all portions. Optionally, a different degree of processing may be provided for the respective portions.

In other words, the second shaping device may be further developed such that the continuous section is shaped only in those portions that were (pre-)shaped exclusively by the first shaping device and not by the punching tool. Naturally, the second shaping device may also be configured such that, as an alternative or in addition, the portions reshaped by the punching tool experience (another) reshaping.

According to an embodiment, the punching tool is designed to be movable in the pultrusion direction at least between a starting position and an end position parallel to the pultrusion direction. The punching tool can thereby accompany the continuous section moving in the pultrusion device at a defined advancing speed (also called drawing speed). This provides the possibility of closing the punching tool in the starting position in order to thereby locally shape the continuous section and hold it in the closed condition until the end position has been reached, so that a shaping can act upon the continuous section for an extended defined time period.

After arriving in the end position, the punching tool is opened again and the continuous profile is released, in which case the punching tool is moved back into its starting position in order to repeat the punching operation on another portion of the continuous section. In this manner, discontinuous changes of cross-section can be carried out in a particularly simple manner and simultaneously a straining of the continuous section as a result of a prolonged "exposure time" can be reduced. This can take place at a constant advancing speed of the pultrusion device, without having to vary the speed for implementing individual processing steps, so that the productivity of the entire pultrusion device is not influenced.

Furthermore, the first shaping device and/or the second shaping device can each be designed for at least partially hardening the continuous section. With respect to a first part, the matrix of the continuous section can thereby first be hardened by way of the first shaping device. In this case, with respect to a certain proportion, the matrix preferably at first remains incompletely hardened; in particular, the matrix may remain in a gel-type state. In this gel-type state, the matrix is, on the one hand, easily workable; on the other hand, it is sufficiently tough for nevertheless providing sufficient stability of shape of the continuous section for the subsequent processing steps. For example, the degree of hardening in the first shaping is selected only just so that a local change of shape is made possible and is nevertheless maintained despite additional tensile load in the pultrusion device.

This is made possible by the local change of shape caused by the punching tool without any damage to the already hardened matrix or the fibers. In the second shaping device, the continuous section can subsequently be hardened with respect to a further part.

Also preferably, the punching tool is designed for: (i) the local removal, for the local displacement and/or for the local reshaping of material of the continuous section, (ii) the local introduction of additional material in the continuous section and/or for the local introduction of insertions, particularly inserts or inlays, into the continuous section, and/or (iii) the local creation of local recesses in the defined portion of the continuous section. Therefore, for example, local recesses, steps in the contour of the continuous section, breakthroughs or holes, as well as other abrupt changes of shape of the cross-sectional profile can be achieved, without damaging the fibers, and optimal strength of the continuous section can be achieved.

Likewise, additional material, such as tapes or so-called "prepreg tapes", metallic elements, such as stringers, or additional plastic elements, for example, plastic webs, can be inserted. In the case of an only partially hardened state of the continuous section, a bonded joining without adhesive is contemplated. In the case of an additional reshaping, the inserted additional material, particularly the above-mentioned additional elements, can be connected in a frictional manner with the matrix of the continuous section (the so-called pultrudate) at the intended point.

In addition, the punching tool may include an exchangeable working attachment, which is designed for causing the local change of shape. By exchanging different working attachments, it becomes possible to provide different geometries for the local change of shape at the punching tool and thereby successively use different working attachments optionally in the case of one and the same continuous section, or to rapidly retrofit the pultrusion device in a simple manner for the production of different geometries of the continuous sections.

Furthermore, the punching tool and/or at least the working attachment can be designed to be heatable, in order to cause a local pre-heating of the continuous section at least in the defined portion. This has the advantage that the matrix of the continuous section is (further) hardened at least in the local portion of the local change of shape and thereby an unintended (later) change of shape by the generally applied tensile force application is prevented. In this case, the local change of shape introduced by means of the punching device, in this case, can be maintained as well as possible despite the constant application of tensile force to the continuous section, which application of tensile force would otherwise result in a resumption of the original shape, whereby a high precision of the change of shape is ensured in a special manner.

As illustrated above, the pultrusion device can include a pulling device for the continuous application of an applied tensile force to the continuous section. The continuous section is thereby continuously acted upon by the tensile force and conveyed through the individual processing stations.

According to a further embodiment, it becomes possible to fill foam material into recesses placed in the continuous section, preferably into a continuous section further developed as a hollow section, which subsequently is foamed and hardened, for example, by a temperature in the second shaping device, in order to fill and, if necessary, support a cavity.

Furthermore, a process is disclosed for producing a fiber-reinforced continuous section, the continuous section having a second cross-sectional profile that is discontinuous in a pultrusion direction. The process includes:

producing a continuous section with a continuous cross-sectional profile;

local punching of the continuous section for causing a local change of shape of the continuous cross-sectional profile in a defined portion of the continuous section, in order to produce a first discontinuous cross-sectional profile of the continuous section;

reshaping the first discontinuous cross-sectional profile of the continuous section into the second discontinuous cross-sectional profile of the continuous section.

Optionally, the step of producing the continuous section with a continuous cross-sectional profile may comprise an at least partially first hardening of the produced continuous section.

In addition, it is contemplated for the process to comprise a step of heating the continuous section for the local hardening, which is carried out during or following the punching step.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
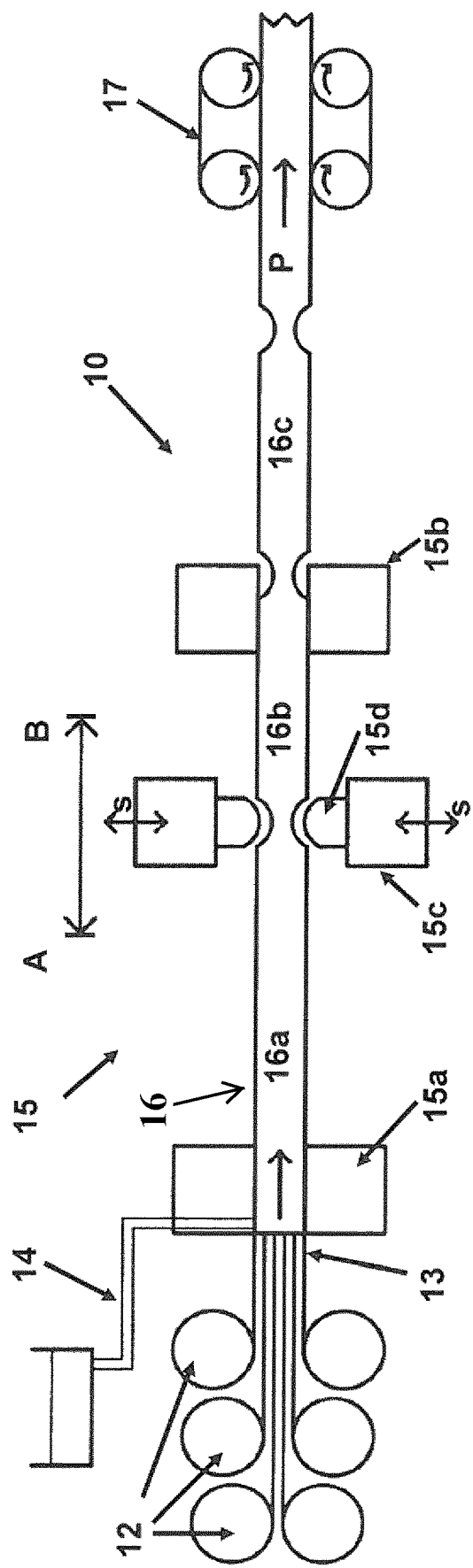
FIG. 1 is a schematic view of an embodiment of a pultrusion device according to the description.

FIG. 1 illustrates a pultrusion device 10 for producing a fiber-reinforced continuous section 16 having a cross-sectional profile which is discontinuous in a pultrusion direction P (in the following called "second discontinuous cross-sectional profile 16c"). In a first step, reinforcing fibers 13, such as glass or carbon fibers, held on coils 12 are withdrawn from the coils 12 and are impregnated by an impregnating tool 14 with a matrix, for example, a resin. Subsequently, the impregnated fibers 13 are pulled through a press forming device 15 and are shaped into a pultrusion section (in the following, also called continuous section). For shaping the continuous section 16, the press forming device 15 comprises a first shaping device 15a for producing the continuous section 16 with a continuous cross-sectional profile 16a (as a first preliminary stage of the final continuous section 16 with the second discontinuous cross-sectional profile 16c), and a second shaping device 15b arranged following the first shaping device 15a in the pultrusion direction P for shaping the final second discontinuous cross-sectional profile 16c of the continuous section 16. In addition, a punching tool 15c is arranged between the first shaping device 15 and the second shaping device 15b and is designed to cause a local change of shape of the continuous cross-sectional profile 16a at least in a defined portion of the continuous section 16 with the continuous cross-sectional profile 16a, in order to produce a first discontinuous cross-sectional profile 16b of the continuous section 16 (second preliminary stage of the final continuous section 16 with the second discontinuous cross-sectional profile 16c).

For example, the punching tool 15c may be designed in several parts in order to act upon the continuous section 16 from several directions for the targeted change of shape, in that the punching tool 15c can be closed and subsequently opened again (see motion arrows S). In addition, the punching tool 15c is preferably designed to be movable in the pultrusion direction P, at least between a starting position A and an end position B, parallel to the pultrusion direction P, so that the punching tool 15c can enclose the continuous profile 16 in the closed condition and is guided along parallel to the continuous section 16, in order to reopen the punching tool 15c when the end position B has been reached.

For example, the punching tool 15c can be designed for the local removal, for the local displacement and/or for the local reshaping of material of the continuous section 16, and/or for the local introduction of additional material in the continuous section 16 and/or for the local introduction of insertions, particularly inserts or inlays, into the continuous section, and/or for the local creation of local recesses in the defined portion of the continuous section, in order to cause a corresponding local change of shape of the continuous section. Corresponding geometrical designs of the punching tool are not illustrated.

The punching tool 15c can optionally have an exchangeable working attachment 15d, which is designed for causing the local change of shape. The exchangeable working attachment 15d can therefore easily be exchanged for another working attachment, for example, for providing a different shape geometry.

In order to convey the continuous section 16 through the individual described processing stations, the pultrusion device 10 additionally has a pulling device 17 for the continuous action upon the continuous section 16 via a tensile force in the pultrusion direction P.

Figure 2:
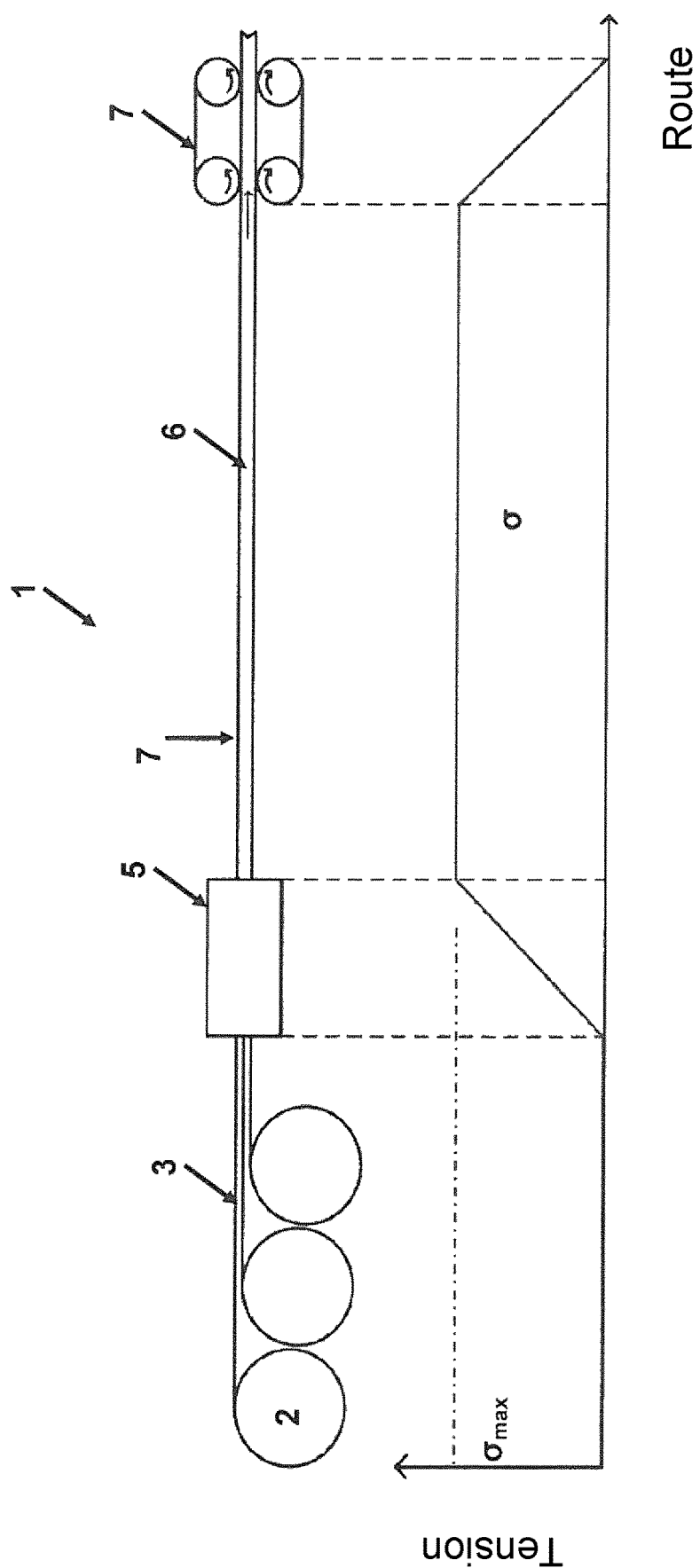
FIG. 2 is a schematic and graphical view of a tension characteristic for a pultrusion device according to the state of the art.

FIG. 2 illustrates a tension characteristic a along the length of the continuous section 6 for a pultrusion device 1 according to the state of the art. For a better representability and clarity, the pultrusion device 1 is shown only in parts in a very simplified fashion. In a first step, reinforcing fibers 3 held on coils 2 are withdrawn from the coils 2 and impregnated by a matrix (not shown). Subsequently, the impregnated fibers 3 are pulled through a press forming device 5 and are shaped to a continuous section 6 with a defined cross-section. The continuous section 6 has a steady continuous cross-sectional profile without steps. The continuous section 6 is conveyed by way of a pulling device 7 through the pultrusion device 1.

The illustrated tension profile σ shows a rise of the tension within the continuous section 6 during the reshaping and hardening of the continuous section 6 in the press forming device 5 to a maximal value $\sigma_{max}$ which is maintained up to the pulling device 7.

In order to now obtain a discontinuous sectional profile from the continuous cross-sectional profile of the continuous section 6, according to the state of the art, a processing of the continuous profile 6 takes place subsequently to the press forming device 5 (for example, in position 7), where the continuous section 6 is acted upon by a maximal tension $\sigma_{max}$. The risk of tearing the continuous profile 6 is very high. Likewise, the matrix is already hardened for the most part, so that, beyond that, damage to the matrix and the fibers fixed in the matrix is very probable.

Figure 3:
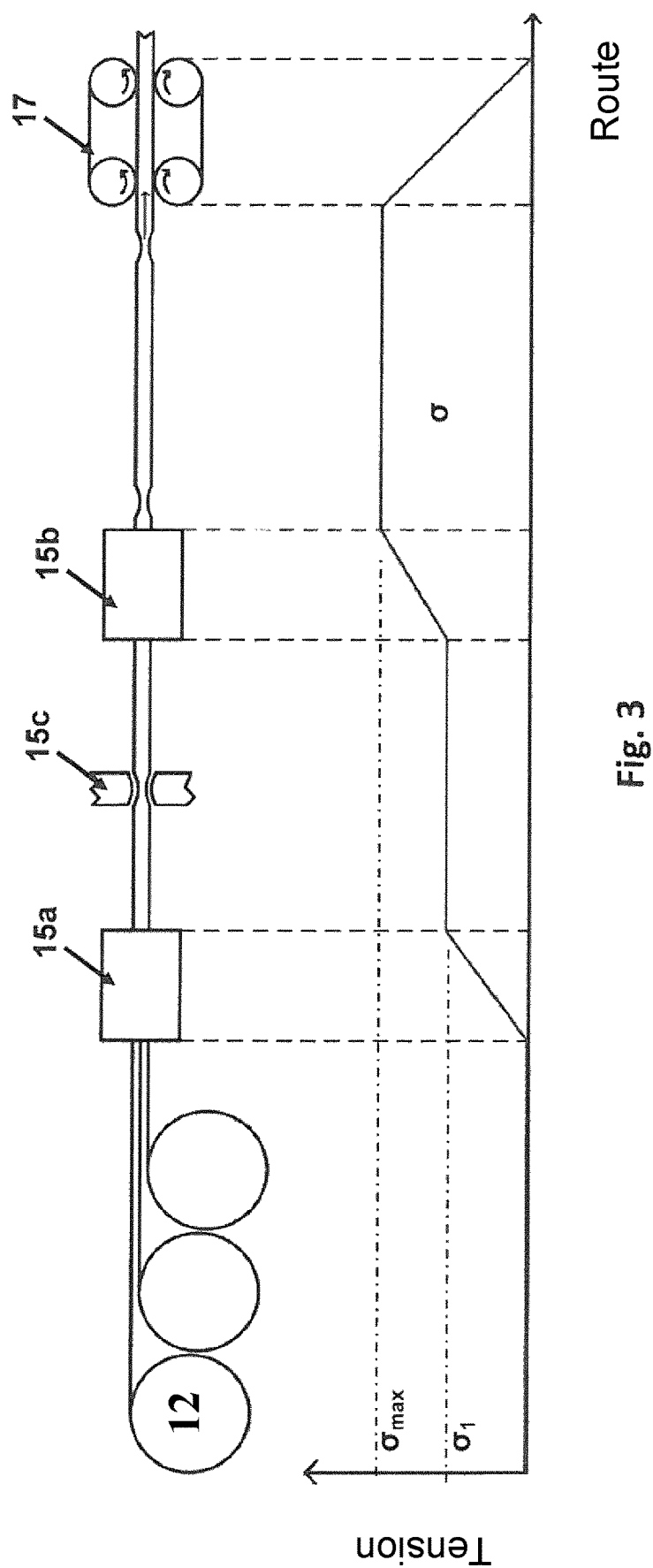
FIG. 3 is a schematic and graphical view of a tension characteristic for a pultrusion device according to FIG. 1.

In contrast, FIG. 3 illustrates a tension characteristic a for a pultrusion device according to FIG. 1. For better clarity, only the coils 12, the first shaping device 15a, the punching tool 15c and the second shaping device 15b as well as the pulling device 17 are illustrated. However, it is understood that all characteristics described with respect to FIG. 1 also apply to FIG. 3.

Also in this case, a maximal tension value $\sigma_{max}$ within the continuous section 16 is reached only at the end of the press forming device 15. However, as a result of the division of the press forming device 15, it becomes possible to process the continuous section 16 in a particularly simple manner after a first reshaping in the first shaping device 15a. In this stage, the continuous section 16 still has a reduced tension load $\sigma_1$ which, in the illustrated embodiment, is at a fraction of the maximal tension value $\sigma_{max}$. The risk of a tearing of the continuous section 16 is considerably reduced because of a processing by way of the punching tool 15c. Only subsequently will the continuous section 16 run through the second shaping device 15b, which follows, in order to reshape the continuous section 16 into its final shape with the final second discontinuous cross-sectional profile 16c.

Optionally, the first shaping device 15a and/or the second shaping device 15b may each be designed for the at least partial hardening of the continuous section 16. A respective degree of hardening can thereby be individually set in each device and can be designed for the demands for an optimal processing capability.

In addition, it is contemplated that the punching tool 15c and/or at least the working attachment 15d is designed to be heatable in order to cause a local advance hardening of the continuous section 16 at least in the defined portion of the local change of shape for preventing an undesired resetting of the carried-out shaping.

By means of the pultrusion device 10 illustrated in FIGS. 1 and 3, a fiber-reinforced continuous section 16 can therefore be produced, which has a second cross-sectional profile 16c discontinuous in the pultrusion direction P. For this purpose, the continuous section 16 is first produced with a continuous cross-sectional profile 16a. Subsequently, a local punching of the continuous section 16 takes place for causing a local change of shape of the continuous cross-sectional profile 16a in one or more defined portions of the continuous section 16, in order to produce a first discontinuous cross-sectional profile 16b of the continuous section 16. Subsequently, a reshaping of the first discontinuous cross-sectional profile 16b of the continuous section 16 takes place into the second discontinuous and final cross-sectional profile 16c of the continuous section 16.

As described above, the step of producing the continuous section 16 with a continuous cross-sectional profile 16a may additionally include an at least partial first hardening of the produced continuous section 16. Furthermore, a step of heating the continuous section 16 can be provided for the local hardening, which step is implemented following the punching step.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A pultrusion device for producing a fiber-reinforced continuous section of a fiber-reinforced material web, which has a second cross-sectional profile that is discontinuous in a pultrusion direction, comprising:
- a pulling device that pulls the fiber-reinforced material web;
- a press forming device that shapes the continuous section, the press forming device arranged upstream of the pulling device, the press forming device comprising:
  - a first shaping device that produces the continuous section having a continuous cross-sectional profile, and
  - a second shaping device that follows the first shaping device in the pultrusion direction, and that shapes the second discontinuous cross-sectional profile of the continuous section; and
- a punching tool distinct from and arranged between the first shaping device and the second shaping device and upstream of the pulling device, the punching tool causing a local change in shape of the continuous cross-sectional profile at least in a defined portion of the continuous section, in order to produce a first discontinuous cross-sectional profile of the continuous section.

2. The pultrusion device according to claim 1, wherein the punching tool is movable in the pultrusion direction at least between a starting position and an end position parallel to the pultrusion direction.

3. The pultrusion device according to claim 1, wherein the first shaping device and/or the second shaping device are each configured to at least partially harden the continuous section.

4. The pultrusion device according to claim 1, wherein the punching tool is configured for one or more of:
- the local removal, for the local displacement and/or for the local reshaping of material of the continuous section,
- the local introduction of additional material in the continuous section and/or for the local introduction of insertions of inserts or inlays into the continuous section, and/or
- the local creation of local recesses in the defined portion of the continuous section.

5. The pultrusion device according to claim 1, wherein the punching tool comprises an exchangeable working attachment, which is configured to cause the local change in shape.

6. The pultrusion device according to claim 5, wherein the punching tool and/or at least the working attachment are configured to be heatable, in order to cause a local advance hardening of the continuous section at least in the defined portion.

7. The pultrusion device according to claim 1, wherein the pulling device provides a substantially continuous pulling force to the continuous section.

* * * * *